United States Patent
Hao

(10) Patent No.: US 11,762,791 B1
(45) Date of Patent: Sep. 19, 2023

(54) SYSTEM, METHOD, AND NON-TRANSITORY COMPUTER READABLE MEDIUM FOR DETECTING BASEBOARD MANAGEMENT CONTROLLER

(71) Applicant: Fulian Precision Electronics (Tianjin) Co., LTD., Tianjin (CN)

(72) Inventor: Li-Yun Hao, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/856,082

(22) Filed: Jul. 1, 2022

(30) Foreign Application Priority Data

Apr. 24, 2022 (CN) .......................... 202210434410.1

(51) Int. Cl.
*G06F 13/20* (2006.01)
(52) U.S. Cl.
CPC .......... *G06F 13/20* (2013.01); *G06F 2213/40* (2013.01)
(58) Field of Classification Search
CPC .................................... G08B 2/00; H05K 1/14
See application file for complete search history.

(56) References Cited

U.S. PATENT DOCUMENTS

| | | | | |
|---|---|---|---|---|
| 2005/0243095 A1* | 11/2005 | Wu | ........................... | G06F 3/14 345/520 |
| 2009/0228730 A1* | 9/2009 | Chin | ......................... | G06F 1/32 713/324 |
| 2010/0219972 A1* | 9/2010 | Shibahara | ............ | H04N 21/485 340/815.4 |
| 2011/0116807 A1* | 5/2011 | Park | ..................... | H04B 10/801 398/164 |
| 2011/0302329 A1* | 12/2011 | Azam | ................. | G06F 13/4081 710/16 |
| 2014/0268620 A1* | 9/2014 | Hung | .................. | G06F 15/7803 361/788 |

FOREIGN PATENT DOCUMENTS

CN 112948185 A 6/2021
TW 202024916 A 7/2020

* cited by examiner

*Primary Examiner* — Getente A Yimer
(74) *Attorney, Agent, or Firm* — ScienBiziP, P.C.

(57) ABSTRACT

A system and a method for detecting baseboard management controller (BMC) includes the BMC and a CPLD. The BMC includes a GPIO and configured to drive the GPIO to output a first signal. The CPLD is connected to the GPIO and is configured to determine a status of the BMC by detecting whether the GPIO outputs the first signal. When the CPLD detects that the GPIO is not outputting the first signal, the CPLD determines that the BMC is in an abnormal status; when the CPLD detects that the GPIO is outputting the first signal and a level status of the first signal is switched in a predetermined time, the CPLD determines that the BMC is in a normal status.

12 Claims, 4 Drawing Sheets

SYSTEM, METHOD, AND NON-TRANSITORY COMPUTER READABLE MEDIUM FOR DETECTING BASEBOARD MANAGEMENT CONTROLLER

CROSS-REFERENCE TO RELATED APPLICATIONS

This application claims priority to Chinese Patent Application No. 202210434410.1 filed on Apr. 24, 2022, the contents of which are incorporated by reference herein.

FIELD

The subject matter herein generally relates to server technology, and particularly to a system, a method, and a non-transitory computer readable medium for detecting baseboard management controller.

BACKGROUND

Baseboard management controller (BMC) includes sensors for monitoring physical status of computer, network server, or other hardware device, and communicates with system administrator through independent connection. When the BMC stops running in the server system, a complex programmable logic device (CPLD) takes over the BMC to execute some functions, such as a pulse width modulation (PWM) of a cooling fan, to ensure the continued running of the server system. If the server system cannot obtain a running status of the BMC in time, when the BMC stops running, the CPLD cannot take over the BMC to execute some functions, the functions of the server system may not work, which affects stability of the server system.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
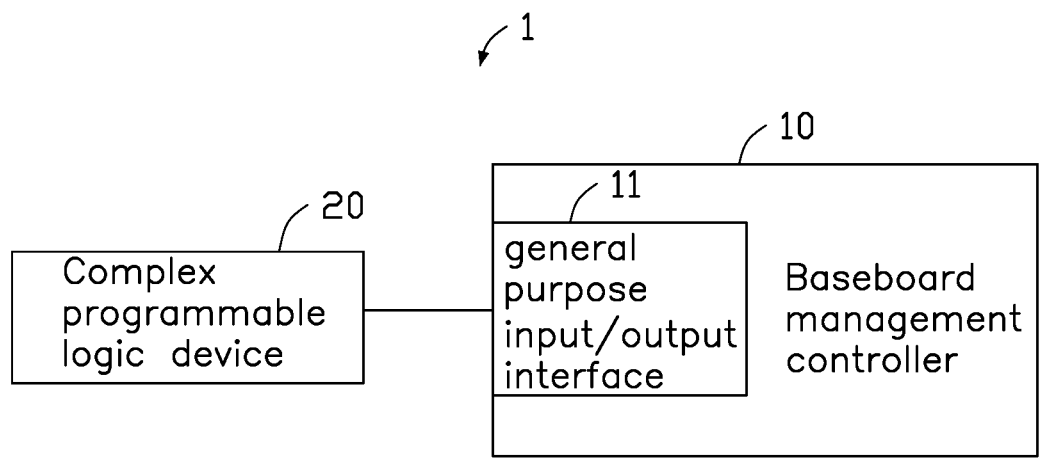
FIG. 1 is a schematic view of an embodiment of a system for detecting BMC.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

FIG. 1 illustrates a schematic view of an embodiment of a system 1 for detecting BMC. The system 1 includes a BMC 10 and a CPLD 20 electrically connected to the BMC 10

In at least one embodiment, the BMC 10 includes a general purpose input/output interface (GPIO) 11. The GPIO 11 may be pins of the BMC 10. When the BMC 10 runs normally, the BMC 10 drives the GPIO 11 to output a first signal.

In at least one embodiment, the first signal may be a clock signal, including two levels of status, such as a high level status and a low level status. That is, when the GPIO 11 outputs a clock signal with high level, the first signal is in high level status; when the GPIO 11 outputs a clock signal with low level, the first signal is in low level status. Particularly, when the BMC 10 runs normally, the BMC 10 drives the GPIO 11 to switch a level status of the first signal with a predetermined signal period (such as a period of 20 seconds). Within such predetermined signal period, the GPIO 11 successively outputs a clock signal with high signal and a clock signal with low signal, a time period of outputting the clock signal with high signal and a time period of outputting the clock signal with low signal being equal (such as 10 seconds per time period).

In at least one embodiment, when the BMC 10 can run normally, the BMC 10 can execute functions of monitoring and controlling, for instance, the BMC 10 may monitor and adjust a temperature, a voltage, a power source, a PWM of a cooling fan of the server system, etc., to ensure health of the server system.

The CPLD 20 is electrically connected to the GPIO 11 and configured to detect a running status of the BMC 10, for instance, the CPLD 20 may determine a status of the BMC 10 through detecting whether the GPIO 11 outputs the first signal.

In detail, when the CPLD 20 does not detect the first signal outputted by the GPIO 11, the CPLD 20 may determine that the BMC 10 is in an abnormal status (such as the BMC being off). Furthermore, the CPLD 20 may take over a part of functions of the BMC 10. For instance, the CPLD 20 may monitor and adjust a temperature, a voltage, a power source, a PWM of a fan of the server system, etc., to ensure normal running of the server system.

In detail, when the CPLD 20 detects the first signal outputted by the GPIO 11, the CPLD 20 may determine the BMC 10 is in a normal status. Furthermore, the CPLD 20 may determine the running status of the BMC 10 by detecting whether a level status of the first signal is switched in a predetermined time T. The predetermined time T may be a predetermined signal cycle of the first signal.

Figure 2:
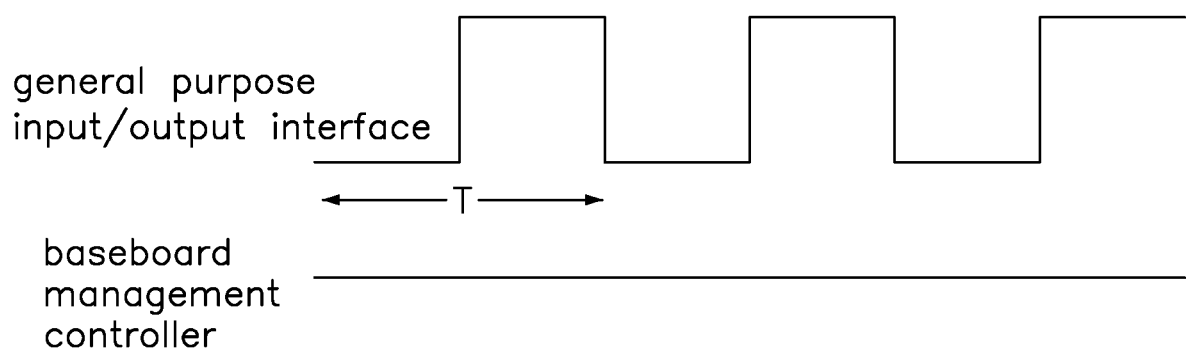
FIG. 2 illustrates a signal oscillogram of a general purpose input/output when a running status of the BMC is abnormal.

In detail, referring to FIG. 2, when the CPLD 20 does not detect that the level status of the first signal is being switched within in the predetermined time T, the CPLD 20 determines that the running status of the BMC 10 is abnormal (such as the BMC 10 malfunctioning).

Figure 3:
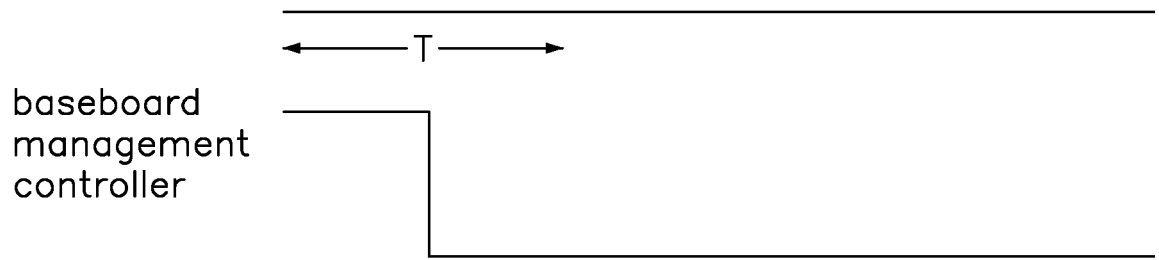
FIG. 3 illustrates a signal oscillogram of a general purpose input/output when a running status of the BMC is normal.

In detail, referring to FIG. 3, when the CPLD 20 detects that the level status of the first signal is being switched in the predetermined time T, the CPLD 20 determines that the running status of the BMC 10 is normal.

Furthermore, if the CPLD 20 does not detect the level status of the first signal being switched in the predetermined time T, that is the CPLD 20 determines that the running status of the BMC 10 is abnormal, the CPLD 20 takes over a part of functions originally executed by the BMC 10, to ensure continued normal running of the server system.

In at least one embodiment, the method for detecting BMC 10 may be applied in the system 1 shown in FIG. 1. The functions may be integrated in the system 1 for the method for detecting BMC 10. In another embodiment, the method for detecting BMC 10 can be run in a form of software development kit in the computer apparatus.

Figure 4:
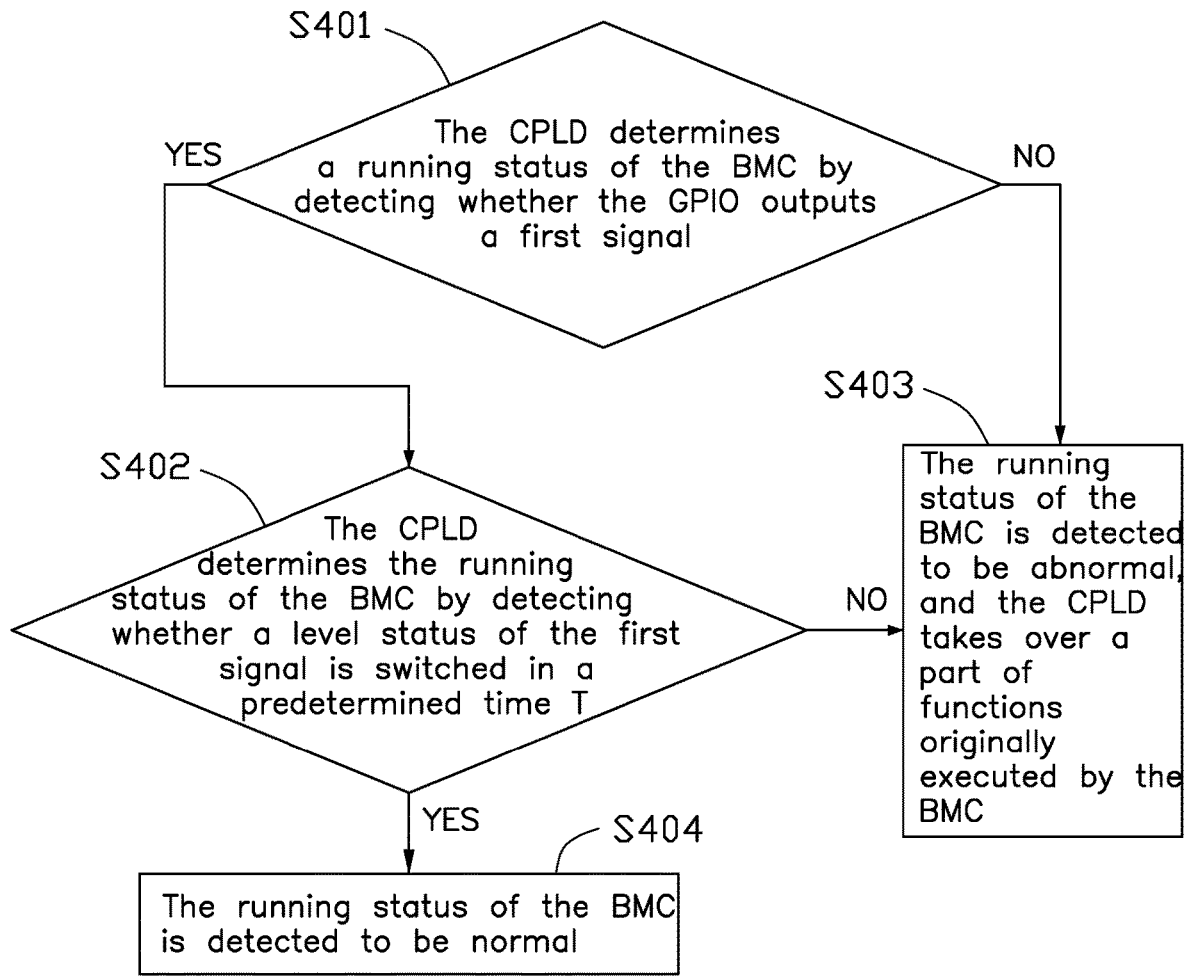
FIG. 4 illustrates a flowchart of an embodiment of a method for detecting BMC.

The method is provided by way of example, as there are a variety of ways to carry out the method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block S401, the CPLD 20 determines a running status of the BMC 10 by detecting whether the GPIO 11 outputs a first signal.

In at least one embodiment, when the BMC 10 runs normally, the BMC 10 drives the GPIO 11 to output the first signal.

In detail, when the CPLD 20 detects that the GPIO 11 is outputting the first signal, the CPLD 20 determines that the BMC 10 is in a running status, then S402 is processed.

In detail, when the CPLD 20 detects no first signal from the GPIO 11, the CPLD 20 determines that the BMC 10 is in an abnormal status, then S403 is processed.

At block S402, the CPLD 20 determines the running status of the BMC 10 by detecting whether a level status of the first signal is switched in a predetermined time T.

In at least one embodiment, the first signal outputted by the GPIO 11 may be a clock signal, that is, the GPIO 11 switches a level status of the first signal with a predetermined signal cycle. The predetermined time T may be the predetermined signal cycle.

In detail, when the CPLD 20 detects that the level status of the first signal is being switched in the predetermined time T, the CPLD 20 determines that the running status of the BMC 10 is normal, then S402 is processed.

In detail, when the CPLD 20 detects that the level status of the first signal is not being switched in the predetermined time T, the CPLD 20 determines that the running status of the BMC 10 is abnormal, then S403 is processed.

At block S403, the running status of the BMC 10 is detected to be abnormal, and the CPLD 20 takes over a part of functions originally executed by the BMC 10.

In at least one embodiment, when the running status of the BMC 10 is abnormal, the CPLD 20 takes over a part of functions originally executed by the BMC 10, to ensure the server system can run normally.

At block S404, the running status of the BMC 10 is detected to be normal.

In the system and method for detecting BMC provided by the present disclosure, the CPLD 20 detects the clock signals outputted by the GPIO 11, as driven by the BMC 10, to determine the running status of the BMC 10. When the CPLD 20 determines that the BMC 10 is in the running status, the CPLD 20 detects whether the level status of the clock signal is being switched in the predetermined time T, so as to determine the running status of the BMC 10. When the CPLD 20 detects that the running status is abnormal, the CPLD 20 takes over a part of functions originally executed by the BMC 10, to ensure the server system runs normally and prevent any damage to the server system caused by abnormal running.

A non-transitory computer-readable storage medium including program instructions for causing the computer apparatus to perform the method for detecting BMC is also disclosed.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A system for detecting baseboard management controller (BMC) comprising:
   a BMC comprising a general purpose input/output (GPIO), the BMC configured to drive the GPIO to output a first signal; and
   a complex programmable logic device (CPLD) connected to the GPIO, the CPLD determining a status of the BMC by detecting whether the GPIO outputs the first signal;
   wherein when the CPLD detects the GPIO outputs the first signal, the CPLD determines the BMC is in an abnormal status; and
   when the CPLD detects the GPIO outputs the first signal and a level status of the first signal is switched in a predetermined time, the CPLD determines the BMC is in a normal status.

2. The system according to claim 1, wherein when the CPLD does not detect the level status of the first signal is switched in the predetermined time, the CPLD determines the BMC is in the abnormal status.

3. The system according to claim 1, wherein when the CPLD does not detect the GPIO outputs the first signal, the CPLD takes over a part of functions originally executed by the BMC.

4. The system according to claim 1, wherein when the BMC is in the normal status, the BMC drives the GPIO to switch the level status of the first signal with a predetermined signal cycle.

5. The system according to claim 4, wherein the level status of the first signal comprises a high level status and a low level status, when the GPIO outputs a clock signal in high level, the first signal is in the high level status, when the GPIO outputs a clock signal in low level, the first signal is in the low level status.

6. The system according to claim 5, wherein when the CPLD detects the GPIO outputs the first signal and the level status of the first signal is not switched in the predetermined time, the CPLD takes over a part of functions originally executed by the BMC.

7. A method for detecting baseboard management controller, the method applied in a system for detecting BMC, the method comprising:
- a CPLD determining a status of a BMC by detecting whether a GPIO outputs a first signal;
- when detecting the GPIO outputs the first signal, the CPLD determining the BMC is in an abnormal status; and
- when detecting the GPIO outputs the first signal and a level status of the first signal is switched in a predetermined time, the CPLD determining the BMC is in a normal status.

8. The method according to claim 7, wherein when the CPLD does not detect the level status of the first signal is switched in the predetermined time, the CPLD determines the BMC is in the abnormal status.

9. The method according to claim 7, wherein when the CPLD does not detect the GPIO outputs the first signal, the CPLD takes over a part of functions originally executed by the BMC.

10. The method according to claim 7, wherein when the BMC is in the normal status, the BMC drives the GPIO to switch the level status of the first signal with a predetermined signal cycle.

11. The method according to claim 10, wherein the level status of the first signal comprises a high level status and a low level status, when the GPIO outputs a clock signal in high level, the first signal is in the high level status, when the GPIO outputs a clock signal in low level, the first signal is in the low level status.

12. The method according to claim 11, wherein when the CPLD detects the GPIO outputs the first signal and the level status of the first signal is not switched in the predetermined time, the CPLD takes over a part of functions originally executed by the BMC.

* * * * *